(12) United States Patent
Cropper

(10) Patent No.: US 9,652,271 B2
(45) Date of Patent: *May 16, 2017

(54) AUTONOMOUSLY MANAGED VIRTUAL MACHINE ANTI-AFFINITY RULES IN CLOUD COMPUTING ENVIRONMENTS

(71) Applicant: International Business Machines Corporation, Armonk, NY (US)

(72) Inventor: Joseph W. Cropper, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 14 days.

This patent is subject to a terminal disclaimer.

(21) Appl. No.: 14/284,626

(22) Filed: May 22, 2014

(65) Prior Publication Data

US 2015/0193245 A1 Jul. 9, 2015

Related U.S. Application Data

(63) Continuation of application No. 14/147,965, filed on Jan. 6, 2014.

(51) Int. Cl.
  *G06F 9/455* (2006.01)
  *G06F 9/50* (2006.01)
  *H04L 12/26* (2006.01)

(52) U.S. Cl.
  CPC ...... *G06F 9/45533* (2013.01); *G06F 9/45558* (2013.01); *G06F 9/50* (2013.01); *H04L 43/08* (2013.01); *G06F 2009/4557* (2013.01)

(58) Field of Classification Search
  None
  See application file for complete search history.

(56) References Cited

U.S. PATENT DOCUMENTS

| | | | |
|---|---|---|---|
| 7,225,356 B2* | 5/2007 | Monitzer | G06F 11/2041 714/10 |
| 8,370,495 B2* | 2/2013 | Jackson | G06F 9/5027 709/226 |
| 8,429,449 B2* | 4/2013 | Biran | G06F 11/008 714/10 |
| 8,775,438 B1* | 7/2014 | Brooker | G06F 9/5027 707/748 |

(Continued)

OTHER PUBLICATIONS

Gulati, Ajay, et al. "Vmware distributed resource management: Design, implementation, and lessons learned." VMware Technical Journal 1.1 (2012): 45-64. Retrieved on [Jan. 7, 2017] Retrieved from the Internet: URL<http://w.waldspurger.org/carl/papers/drs-vmtj-mar12.pdf>.*

(Continued)

*Primary Examiner* — Thuy Dao
*Assistant Examiner* — Cheneca Smith
(74) *Attorney, Agent, or Firm* — Patterson + Sheridan, LLP

(57) ABSTRACT

System, method, and computer program product to perform an operation comprising collecting performance metrics of a first virtual machine, and defining, based on the collected performance metrics, at least one rule to restrict collocation of the first virtual machine with other virtual machines on one or more host machines in a cloud computing environment.

7 Claims, 5 Drawing Sheets

(56) References Cited

U.S. PATENT DOCUMENTS

| | | | | |
|---|---|---|---|---|
| 8,966,084 | B2* | 2/2015 | Dow | G06F 9/06 707/E17.004 |
| 9,052,935 | B1* | 6/2015 | Rajaa | G06F 9/45558 |
| 2005/0138517 | A1* | 6/2005 | Monitzer | G06F 11/2041 714/746 |
| 2011/0072208 | A1 | 3/2011 | Gulati et al. | |
| 2011/0214005 | A1* | 9/2011 | Biran | G06F 11/008 714/1 |
| 2012/0324073 | A1* | 12/2012 | Dow | G06F 9/5088 709/223 |
| 2013/0097464 | A1 | 4/2013 | Ahmad et al. | |
| 2013/0205005 | A1* | 8/2013 | Ashok | G06F 15/17 709/224 |
| 2013/0262915 | A1* | 10/2013 | Frank | H04L 41/0663 714/4.11 |
| 2014/0068608 | A1* | 3/2014 | Kulkarni | G06F 9/45558 718/1 |
| 2014/0181046 | A1* | 6/2014 | Pawar | G06F 11/1484 707/654 |
| 2015/0135003 | A1* | 5/2015 | Cota-Robles | G06F 11/1666 714/6.3 |
| 2015/0193244 | A1 | 7/2015 | Cropper | |

OTHER PUBLICATIONS

Sharma, Bikash, et al. "CloudPD: Problem determination and diagnosis in shared dynamic clouds." 2013 43rd Annual IEEE/IFIP International Conference on Dependable Systems and Networks (DSN). IEEE, 2013. Retrieved on [Jan. 7, 2017] Retrieved from the Internet: URL<http://ieeexplore.ieee.org/stamp/stamp.jsp?arnumber=6575298>.*

Pete Zerger; "Private Cloud: Configuring anti-affinity between VMs on Hyper-V 2008 R2 SP1 and VMM 2012", pp. 1-5, Jan. 31, 2012, <http://www.systemcentercentral.com/private-cloud-configuring-anti-affinity-between-vms-on-hyper-v-2008-r2-sp1-and-vmm-2012/>.

"VM-VM Affinity Rule Conflicts", <http://pubs.vmware.com/vsphere-4-esx-vcenter/index.jsp?topic=/com.vmware.vsphere.resourcemanagement.doc_41/using_drs_clusters_to_manage_resources/c_using_vm_host_drs_rules.html>, vmware.com, retrieved Apr. 30, 2013.

U.S. Appl. No. 14/147,965, entitled "Autonomously Managed Virtual Machine Anti-Affinity Rules in Cloud Computing Environment", filed Jan. 6, 2014.

* cited by examiner

AUTONOMOUSLY MANAGED VIRTUAL MACHINE ANTI-AFFINITY RULES IN CLOUD COMPUTING ENVIRONMENTS

CROSS-REFERENCE TO RELATED APPLICATIONS

This application is a continuation of co-pending U.S. patent application Ser. No. 14/147,965, filed Jan. 6, 2014. The aforementioned related patent application is herein incorporated by reference in its entirety.

BACKGROUND

The present disclosure relates to cloud computing, and more specifically, to providing autonomously managed virtual machine anti-affinity rules in cloud computing environments.

Typically, cloud platforms are seeded by hundreds of system images, each having their own software configurations. For example, several images may package components for a 3-tier application, which includes a web server, application server, and a database. These components all compete for the same physical resources, such as the CPU, memory, network, and/or storage. Problems ensue when too many virtual machines targeting the same physical resource end up on the same host system.

SUMMARY

Embodiments disclosed herein include a system, method, and computer program product to perform an operation comprising collecting performance metrics of a first virtual machine, and defining, based on the collected performance metrics, at least one rule to restrict collocation of the first virtual machine with other virtual machines on one or more host machines in a cloud computing environment.

DETAILED DESCRIPTION

Embodiments disclosed herein provide a cloud computing environment that autonomously collects host machine and virtual machine performance metrics over time to determine the physical system resources that each virtual machine requires. Based on the collected performance metrics, system software in the cloud computing environment may create an "anti-affinity plan" that specifies which virtual machines should or should not be colocated (i.e., deployed on the same host machine). The anti-affinity plan may include one or more system-generated rules and/or metadata for different virtual machines. For example, the system may collect performance metrics indicating that virtual machine (VM) A consumes 85% of the processing power on its host machine. The system, in response, may generate metadata indicating that VM A requires significant CPU resources, and may generate a rule indicating that VM A should not be colocated with other virtual machines that require significant CPU utilization. Additionally or alternatively, the rule may specify that VM A and VM B should not be colocated. As another example, the rule may specify that the combined CPU consumption of virtual machines on a given host cannot exceed a certain threshold (such as 95%), in which case the system verifies that the combined CPU consumption of each VM does not exceed the threshold. Because the performance metrics are collected over time, the system may modify or delete rules. For example, if VM A's CPU utilization lowers over time to 30%, the system may modify or delete the co-location rule for VM A.

As used herein, "performance metrics" includes any metric of a computing system, such as CPU utilization, memory utilization, disk utilization, and network utilization. Any reference to specific metrics is for illustrative purposes only, and should not be considered limiting of the disclosure. Generally, embodiments disclosed herein may monitor any performance metric of any attribute of a computing system, and use the collected metrics to influence the rules, metadata, and the overall anti-affinity plan. The anti-affinity plan may include, but is not limited to, one or more rules, attributes, and/or other metadata, which may be modified over time.

Figure 1A:
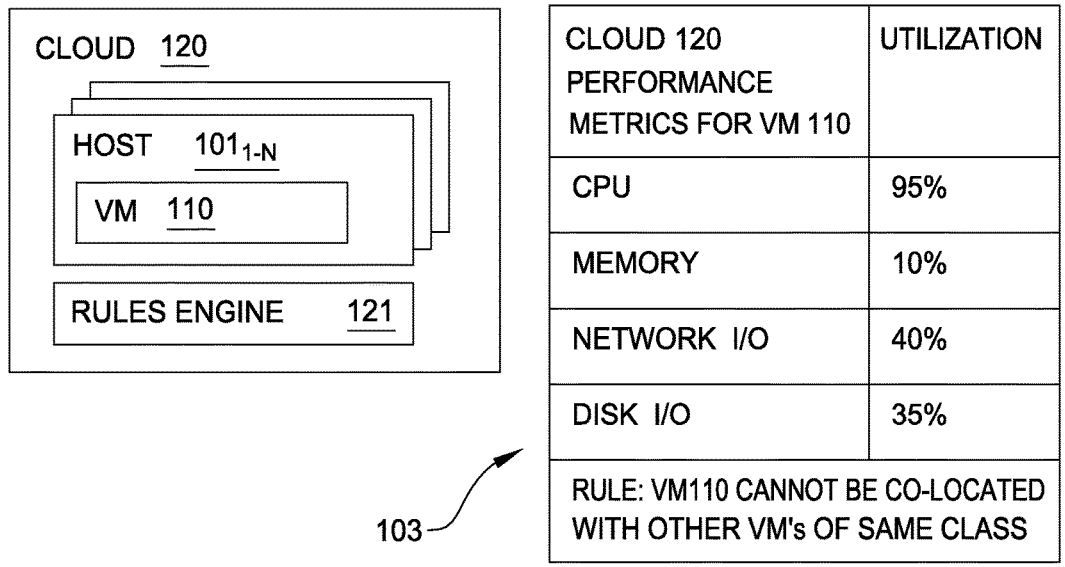
FIGS. 1A-1C illustrate autonomously managed virtual machine anti-affinity rules in cloud computing environments, according to one embodiment.

FIG. 1A illustrates autonomously managed virtual machine anti-affinity rules in public and private clouds, according to one embodiment. As shown, one or more host machines $101_{1-N}$ executes an instance of a virtual machine (VM) 110 in a cloud computing environment 120. While FIG. 1A depicts more than one host machine $101_{1-N}$ in the cloud 120, each host machine $101_{1-N}$ need not host an instance of the VM 110. Instead, the cloud 120 may include any number of host machines executing zero or more virtual machines. The cloud computing environment 120 may be a public or private cloud which generally provides computing resources on a number of host machines connected through a network. The VM 110 may be any type of virtual machine, which may offer any type of computing service. The hosts $101_{1-N}$ may include a hypervisor (not pictured) or some other designated component which collects performance metrics for the VM 110 executing on the respective host machine. The performance metrics may include CPU utilization, memory utilization, disk utilization, and network utilization. The hypervisors may collect the performance statistics over time, and send the collected metrics to a rules engine 121 executing in the cloud computing environment. The rules engine 121 may then use the aggregated performance metrics from each host machine $101_{1-N}$ to generate the rules as part of a cloud-wide anti-affinity plan.

As shown, the table 103 reflects example aggregated performance metrics for each instance of the VM 110 executing on the host machines $101_{1-N}$ in the cloud computing environment 120. The table 103 shows that VM 110 utilizes, on average, 95% of the CPU resources, 10% of the memory resources, 40% of the network I/O resources, and 35% of the disk I/O resources of each host (or the cloud 120). As such, the rules engine 121 may create metadata regarding VM 110, which may specify that the VM 110 has high CPU requirements. In addition, the rules engine 121 may generate an anti-affinity rule based on the collected performance metric data for VM 110. Generally, the rules engine 121 may generate any type of rule that restricts the co-location of virtual machines that may otherwise result in system errors or performance degradation. For example, the rules engine 121 may generate a rule specifying that the VM 110 may not be colocated with other CPU intensive virtual machines, such as a class of virtual machines that utilize more than a threshold percentage of available CPU capacity. The rule may also be more specific. For example, if another VM 130 (not pictured) is known to utilize 80% of CPU resources, the rule may specify that VM 110 and VM 130 cannot be colocated. The rules engine 121 may apply the rules to parent images of the VM 110, such that subsequent deployments of virtual machines in the cloud 120 are in conformity with the rule. In addition, if the current deployments in the cloud 120 are in violation of the rule, the rules engine 121 may cause the cloud configuration to change in order to conform to the rule. For example, if VM 110 is colocated with VM 130 on host $101_1$, the rules engine 121 (or another designated component of the cloud 120) may move at least one of the VMs 110, 130 from the host $101_1$.

Figure 1B:
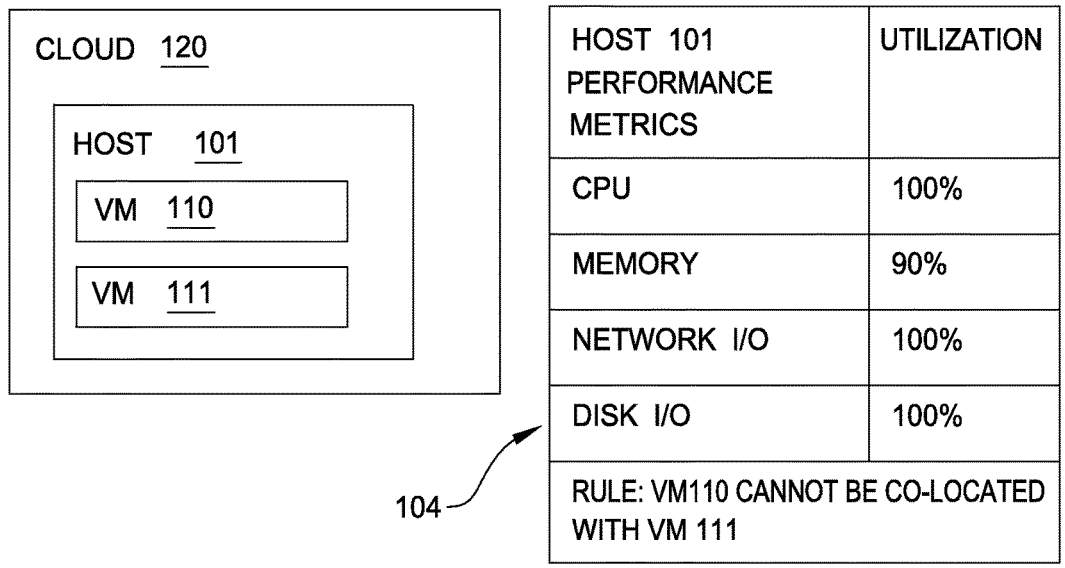

FIG. 1B illustrates autonomously managed virtual machine anti-affinity rules in public and private clouds, according to one embodiment. As shown, two virtual machines 110 and 111 execute on a host 101 in the cloud 120. A hypervisor of the host 101 may collect performance metrics for the host 101 (as well as statistics for each VM 110, 111). The hypervisor may send the collected performance metrics to the rules engine 121. The example performance metrics of the host 101 are reflected in table 104. As shown in table 104, the host 101 has a CPU utilization of 100%, memory utilization of 90%, network I/O utilization of 100%, and disk I/O utilization of 100%. Although FIG. 1B illustrates a single host executing the VMs 110, 111, multiple host machines in the cloud 120 may concurrently execute the colocated VMs 110, 111, and a hypervisor of each host may send the respective performance metric data to the rules engine 121. When the rules engine 121 analyzes the performance metric data, the rules engine 121 may define a new rule indicating that VM 110 and VM 111 cannot be colocated on the same physical host. In response, the rules engine 112 (or another designated component of the cloud 120) may move optionally at least one of the VMs 110, 111 from the host 1010 to another host. Generally, in defining the different rules, the rules engine 121 may reference a repository of higher level, cloud-wide rules indicating predefined performance metric thresholds. For example, a first cloud-wide rule may specify that no host in the cloud 120 should have a memory utilization which exceeds 93%, while a second cloud-wide rule specifies that no virtual machine executing in the cloud (or a host in the cloud) should exceed 97% network I/O utilization.

Figure 1C:
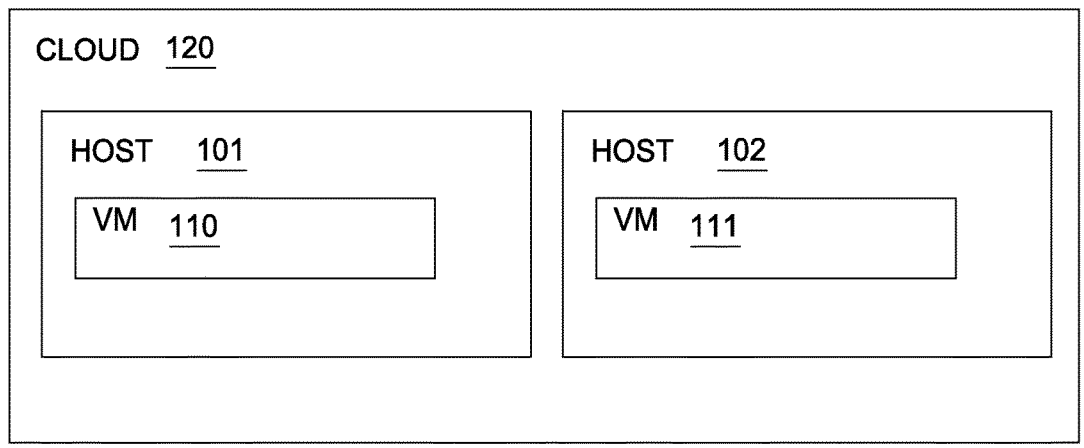

FIG. 1C illustrates the cloud 120 subsequent to the rules engine 121 defining the rule that VMs 110, 111 cannot be colocated on the same virtual machine. As shown, VM 110 now executes on host 101, while VM 111 now executes on host 102. Because the VMs 110, 111 are now located on different physical hosts, the VMs 110, 111 should be able to execute without creating resource conflicts on the host 101. The hypervisors of each host 101, 102 may then continue to monitor the performance metrics of their respective host machine (as well as each virtual machine on the host), and send the performance metric data to the rules engine 121. If the rules engine 121 determines that the resource utilization of VMs 110, 111 have reduced to the point where they can now be colocated, the rules engine 121 may modify or delete the rule specifying that the VMs 110, 111 cannot be colocated.

Figure 2:
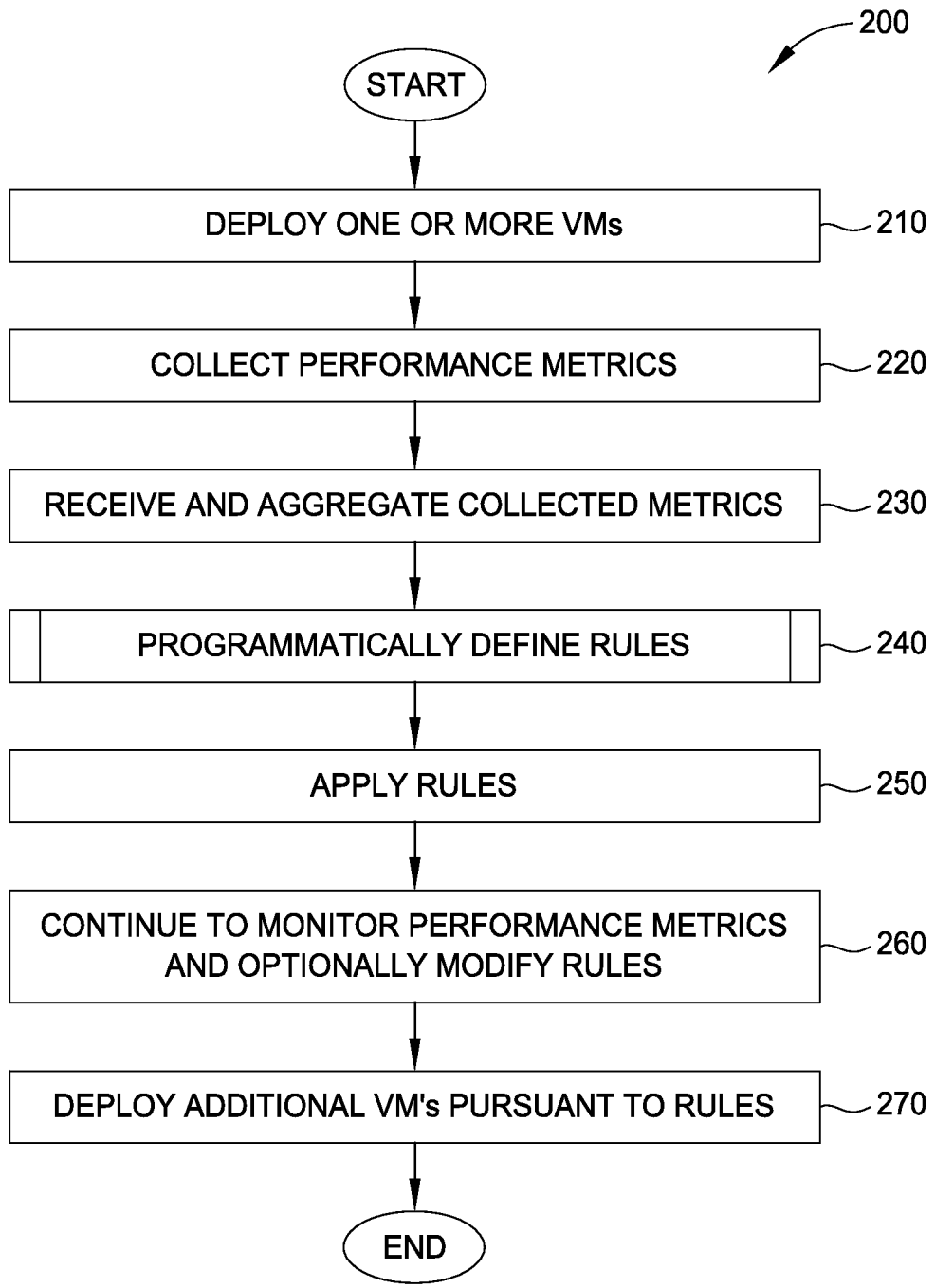
FIG. 2 is a flow chart illustrating a method to autonomously manage virtual machine anti-affinity rules in cloud computing environments, according to one embodiment.

FIG. 2 is a flow chart illustrating a method 200 to autonomously manage virtual machine anti-affinity rules in public and private clouds, according to one embodiment. Generally, the steps of the method 200 collect performance metrics of one or more host machines (and/or virtual machines executing on the host machines) in order to programmatically create and/or modify anti-affinity rules that control the placement and co-location of virtual machines in a cloud computing environment. Over time, the generated rules provide the framework for a cloud-wide anti-affinity plan that helps reduce the likelihood of resource conflicts between two or more virtual machines executing on a host in the cloud computing environment.

At step 210, a user or a designated component of the cloud computing environment may deploy one or more virtual machines to one or more hosts in the cloud computing environment. The virtual machines may provide, for example, a 3-tier application, which may include a web server, application server, and a database. At step 220, a designated component of the host machines (such as a hypervisor), collects performance metrics from the host machine and/or virtual machines executing on the host machine. The metrics may include, but are not limited to, host or virtual machine CPU utilization, memory utilization, network I/O utilization, and disk I/O utilization. For example a first host executing a first virtual machine may report that the first virtual machine is consuming 80% of the available memory resources on the first host, while a second host executing the first virtual machine may report that the first virtual machine consumes 70% of the available memory on the second host. At step 230, a designated component in the cloud computing environment, such as the rules engine 112, receives the metrics collected by the hypervisors at step 220. If more than one hypervisor sends metrics to the rules engine 112, the rules engine 112 may aggregate the collected performance metrics where applicable, such as on a host or virtual machine level. Continuing with the previous example, the rules engine 112 may aggregate the memory utilization metrics from the first host and the second host and average their values to determine that the first virtual machine consumes, on average, 75% of the available memory on a given host.

At step 240, discussed in greater detail with reference to FIG. 3, the rules engine 112 programmatically defines rules for the anti-affinity plan based on the performance metrics collected by the hypervisors in the cloud computing environment. The rule may specify one or more virtual machines, or more generally apply to a class of virtual machines with common characteristics, vis a vis a the first virtual machine. For example, the rules engine 112 may define a first rule specifying that the first virtual machine cannot be colocated with a second virtual machine if the rules engine 112 determines that the second virtual machine utilizes on average 50% of the memory on a host machine. As another example, the rules engine 112 may define a second rule specifying that the first virtual machine cannot be colocated with any virtual machine that utilizes 20% of the memory on a host machine. Furthermore, the rule may specify general policies that apply to all virtual machines. For example, the rule may specify that two virtual machines that collectively consume more than a threshold percentage (such 90%) of the network bandwidth of a given host cannot be colocated on the same host.

At step 250, the rules engine 112 enforces the rules in the cloud computing environment. This step may include applying the rules to the subject parent images of each virtual machine. Additionally, the rules engine 112 or other components in the cloud computing environment may perform operations to identify and resolve any existing conflicts in the cloud computing environment. For example, if the first host executes the first virtual machine and the second virtual machine, the rules engine 112 may cause at least one of the first and second virtual machines to move to a different virtual machine in light of a rule specifying that the first and second virtual machines cannot execute on the same host.

At step 260, the hypervisors continue to monitor host and virtual machine statistics, which the rules engine 112 may use to create new rules, as well as modify or delete existing rules. For example, if the rules engine 112 determines that the aggregated statistics for the first virtual machine indicate that it now averages 40% memory utilization, the rules engine 112 may modify or delete existing rules to reflect the decrease in memory utilization. Generally, the hypervisors may collect performance statistics at customizable, predefined intervals, and periodically send the collected performance metrics to the rules engine 112 at customizable intervals. The rules engine 112 may be configured to create, modify, and delete rules at customizable intervals, as well as responsive to receiving an indication that one or more predefined events has occurred, such as a resource conflict on one or more virtual machines in the cloud. At step 270, a user or a designated component of the cloud computing environment deploys additional virtual machines pursuant to the rules defined by the rules engine 112.

Figure 3:
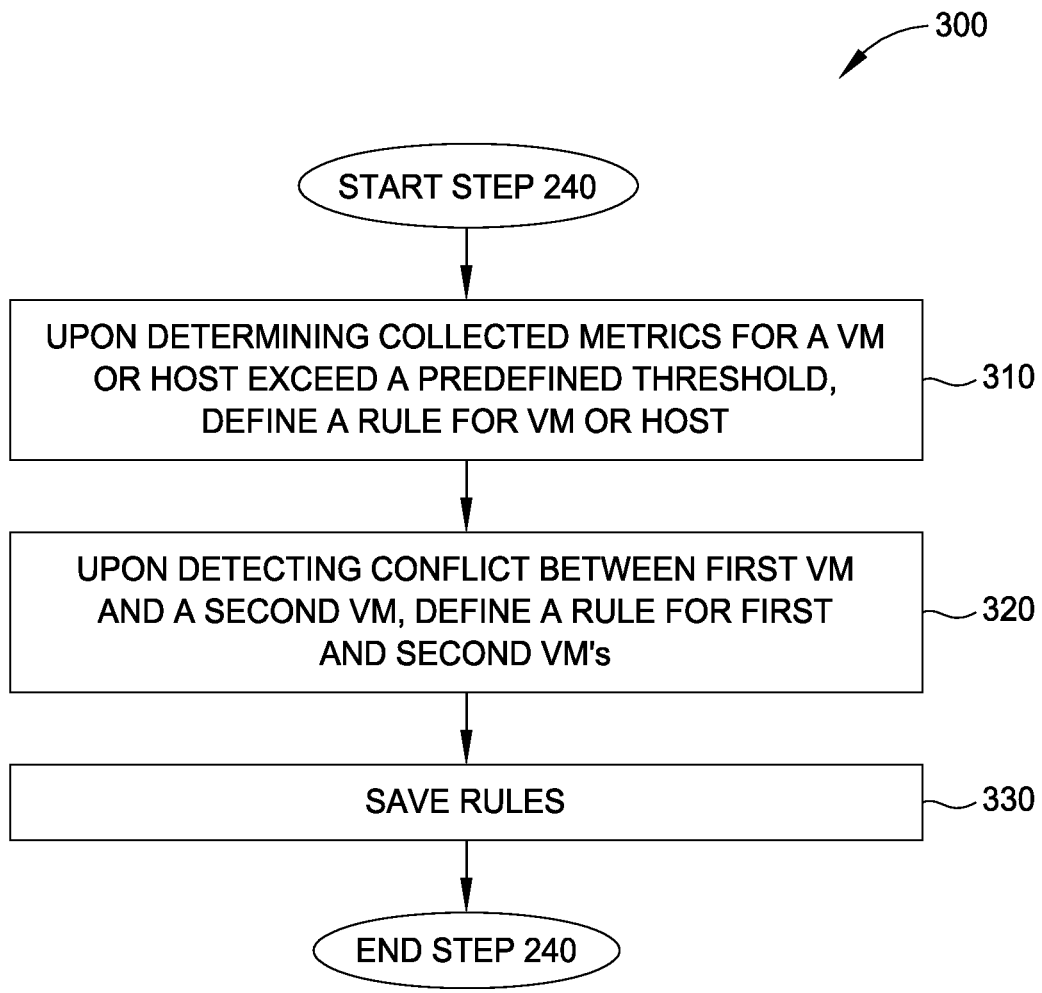
FIG. 3 is a flow chart illustrating a method to define rules, according to one embodiment.

FIG. 3 is a flow chart illustrating a method 300 corresponding to step 240 to programmatically define rules, according to one embodiment. Generally, the rules engine 112 may execute the steps of the method 200 in order to create rules and metadata that form part of a cloud-wide anti-affinity policy used to reduce the likelihood of resource conflicts arising between virtual machines executing on the same host machine. At step 310, the rules engine 112 may define a rule upon determining that the collected metrics for a virtual machine or host exceed a predefined threshold. For example, if the rules engine 112 determines that virtual machine Y utilizes 85% of the disk I/O capacity on one or more host machines, the rules engine 112 may define a rule indicating that VM Y cannot be colocated with any other virtual machine that is known to utilize more than 10% of available disk I/O capacity. If a second virtual machine, VM X, is known to utilize 20% of the available disk I/O capacity, the rules engine may define a rule specifying that VM X and VM Y cannot be colocated on the same physical host.

At step 320, the rules engine 112 may define a rule upon detecting a resource conflict between a first VM and a second VM executing on a host machine. For example, the hypervisor on a host may determine that the first and second VMs collectively consume 100% of the CPU and memory resources on the host, leading to one or more failures on the host machine. The hypervisor may inform the rules engine 112 of the performance metrics, as well as provide an indication of the system failure. In response, the rules engine 112 may define a rule indicating that the first and second VMs cannot be colocated on the same physical host machine.

At step 330, the rules engine 112 saves the generated (or updated) rules for future use. The rules engine 112 may store the rules in a rules repository, as well as save them as metadata associated with a parent image of one or more virtual machines subject to the rule.

Figure 4:
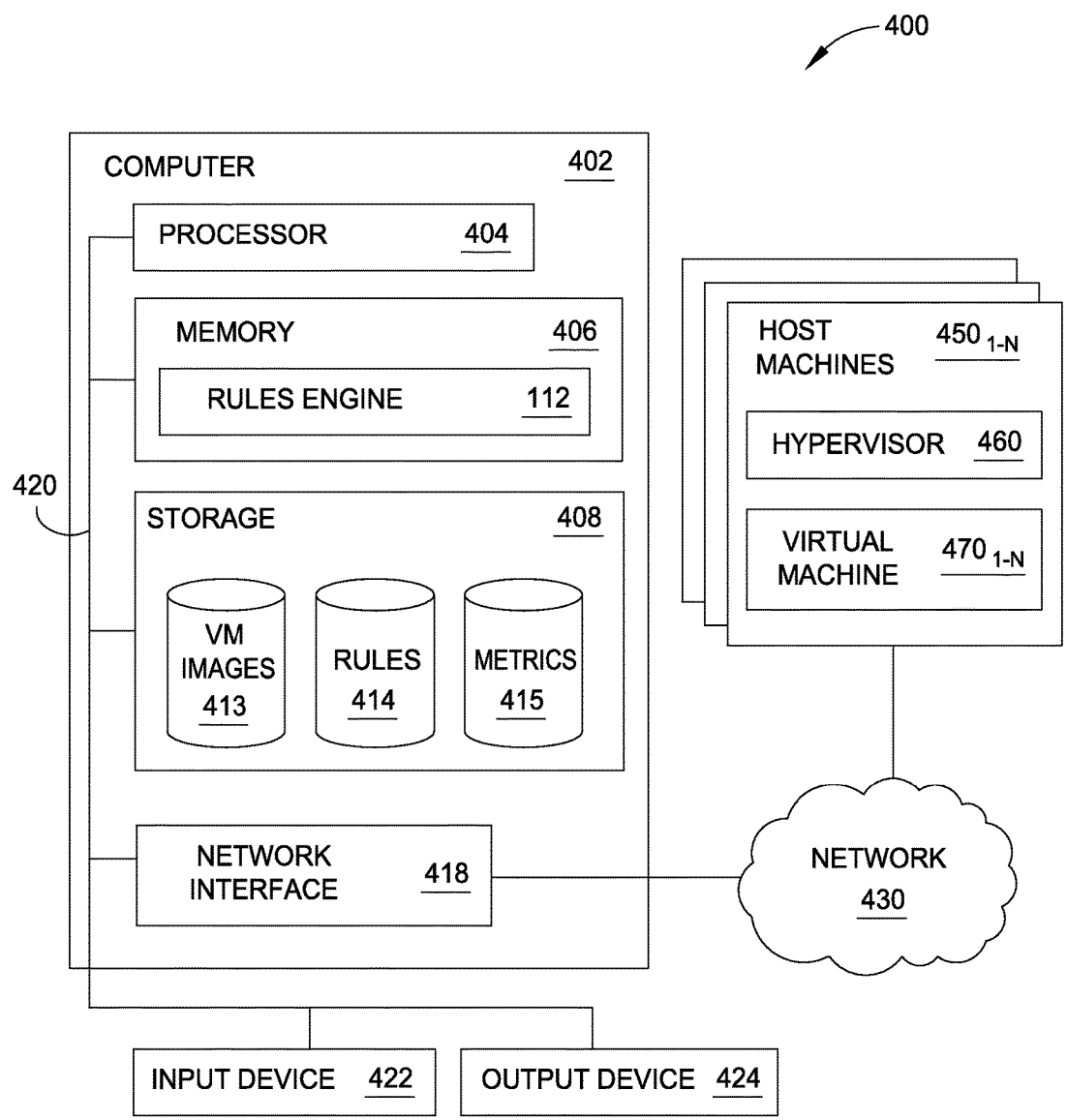
FIG. 4 is a block diagram illustrating a system to autonomously manage virtual machine anti-affinity rules in cloud computing environments, according to one embodiment.

FIG. 4 is a block diagram illustrating a system 400 to autonomously manage virtual machine anti-affinity rules in cloud computing environments. The cloud computing system 400 includes a computer 402. The computer 402 may also be connected to other computers via a network 430. In general, the network 430 may be a telecommunications network and/or a wide area network (WAN). In a particular embodiment, the network 430 is the Internet.

The computer 402 generally includes a processor 404 connected via a bus 420 to a memory 406, a network interface device 418, a storage 408, an input device 422, and an output device 424. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is included to be representative of a single CPU, multiple CPUs, a single CPU having multiple processing cores, and the like. The network interface device 418 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state drives, SAN storage, NAS storage, removable memory cards or optical storage. The memory 406 and the storage 408 may be part of one virtual address space spanning multiple primary and secondary storage devices.

The input device 422 may be any device for providing input to the computer 402. For example, a keyboard and/or a mouse may be used. The output device 424 may be any device for providing output to a user of the computer 402. For example, the output device 424 may be any conventional display screen or set of speakers. Although shown separately from the input device 422, the output device 424 and input device 422 may be combined. For example, a display screen with an integrated touch-screen may be used.

As shown, the memory 406 contains the rule engine 112, which is an application generally configured to autonomously define anti-affinity rules based on performance metrics collected by one or more hypervisors 460 executing on one or more host machines $450_{1-N}$ in the cloud computing environment. The hypervisors 460 collect performance statistics of the host machines $450_{1-N}$, as well as virtual machines $470_{1-N}$ executing thereon, and provide the collected statistics to the rules engine 112. When the rules engine 112 identifies a resource conflict between two or more virtual machines $470_{1-N}$ executing on the same host machine $450_{1-N}$, the rules engine 112 may generate a rule regulating the co-location of the virtual machines causing the conflict. For example, if two of three virtual machines executing on a host machine result in an unstable network utilization, the rules engine 112 may define a rule specifying that the two offending virtual machines cannot be colocated on the same host machine. In addition, the rules engine 112 may proactively define rules without detecting a conflict as a prerequisite. For example, if a virtual machine consumes greater than a threshold amount of a performance metric (such as 95% of host memory), the rules engine 112 may define a rule specifying that the virtual machine cannot be colocated with other memory-intensive virtual machines.

As shown, storage 408 contains the VM images 413, which is a repository storing one or more virtual machine images that may be deployed on to one or more host machines $450_{1-N}$ in the cloud computing system 400. The VM images 413 may include metadata regarding the performance metrics of each virtual machine image, as well as specific rules generated by the rules engine 112 (or metadata related to those rules). The storage 408 also includes a rules repository 414 which is used to store rules generated by the rules engine 412. The metrics 415 is a repository for metrics received by the rules engine 112 from the hypervisors 460. The rules engine 112 may compare historic metric data in the metrics 415 to newly received metric data from the hypervisors 460 in order to determine whether or not to modify or delete an existing rule. Although depicted as databases, any suitable structure may be used to store the VM images 413, the rules 414, and the metrics 415.

Advantageously, embodiments disclosed herein monitor host-provided statistics (for the host and any virtual machine executing on the host) in order to autonomously and asynchronously generate co-location rules as part of a cloud-wide anti-affinity plan. By identifying those virtual machines that consume the same resources, the anti-affinity plan may be populated with rules ensuring that these virtual machines are not deployed to the same host machine, reducing the likelihood of failure and other problems. The rules may be changed or deleted over time in order to reflect the most current performance metrics across the cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the rules engine could execute on a computing system in the cloud and create anti-affinity rules for the cloud. In such a case, the rules engine could create a cloud-wide anti-affinity policy and store the rules and the policy at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    collecting performance metrics of: (i) a first virtual machine, and (ii) a first host machine in a cloud computing environment executing the first virtual machine;
    determining, based on the collected performance metrics, that use of a first system resource of the first host machine exceeds a first threshold;
    detecting a resource conflict between the first virtual machine and a third virtual machine executing on the first host machine;
    programmatically generating, based on the collected performance metrics, the resource conflict, and the use of the first system resource of the first host machine exceeding the first threshold, a first rule to restrict co-location of the first virtual machine with other virtual machines on host machines in the cloud computing environment;
    associating the first rule with a parent image of the first virtual machine and the third virtual machine, wherein the first virtual machine is a clone of the parent image;
    enforcing the first rule in the cloud computing environment by: (i) restricting a second virtual machine cloned from the parent image from being co-located with the first virtual machine on the first host machine, (ii) deploying the second virtual machine on a second host machine in the cloud computing environment, and (iii) moving the third virtual machine from the first host machine to a third host machine to resolve the conflict;
    collecting additional performance metrics of: (i) the first and second virtual machines, and (ii) the first and second host machines;
    determining, based on the additional performance metrics, that use of a second system resource of the first host machine exceeds a second threshold; and
    modifying the first rule based on the additional performance metrics of the second system resource, wherein the modified first rule further restricts co-location of virtual machines based on the second system resource.

2. The method of claim 1, wherein modifying the first rule restricts co-location of the first and second virtual machines on the second host machine.

3. The method of claim 1, wherein the first rule is further generated upon determining: (i) the collected performance metrics reflect that use of a second system resource of the host machine exceed a second threshold, and (ii) a system failure has occurred based on the use of the first and second system resources exceeding the thresholds.

4. The method of claim 1, wherein the performance metrics comprise at least one of: (i) a processor utilization, (ii) a memory utilization, (iii) network I/O rates, and (iv) disk I/O rates.

5. The method of claim 1, wherein the first rule is further associated with a first class of virtual machines defined by a shared characteristic, wherein the first class of virtual machines includes: (i) the first virtual machine, (ii) the parent image, (iii) subsequent instances of virtual machines cloned from the parent image, (iv) a third virtual machine, (v) a parent image of the third virtual machine, and (vi) subsequent instances of virtual machines cloned from the parent image of the third virtual machine, wherein the shared characteristic comprises a level of use of each of a plurality of system resources that exceeds a respective threshold level of use for each of the plurality of system resources.

6. The method of claim 1, further comprising:
    determining, based on the additional performance metrics, that use of the first system resource of the first host machine does not exceed the first threshold; and
    deleting the first rule based on the updated performance metrics and the use of the system resource not exceeding the first threshold.

7. The method of claim 6, further comprising subsequent to deleting the first rule:
   collecting additional performance metrics of: (i) the first and second virtual machines, and (ii) the first and second host machines;
   determining, based on the additional performance metrics, that use of a third system resource of the first host and second machines exceeds a third threshold;
   programmatically generating, based on the collected performance metrics and the use of the third system resource of the first host machine exceeding the third threshold, a third rule to restrict co-location of the first virtual machine with other virtual machines on host machines in the cloud computing environment; and
   enforcing the third rule in the cloud computing environment by: (i) restricting a third virtual machine cloned from the parent image from being co-located with the first and second virtual machines on the first and second host machines, respectively, and (ii) deploying the third virtual machine on a third host machine in the cloud computing environment.

\* \* \* \* \*